US012803742B2

(12) United States Patent
Zhang et al.

(10) Patent No.: US 12,803,742 B2
(45) Date of Patent: Nov. 17, 2026

(54) METHOD AND APPARATUS FOR TRANSMITTING A REFERENCE SIGNAL

(71) Applicant: ZTE CORPORATION, Shenzhen (CN)

(72) Inventors: Shujuan Zhang, Shenzhen (CN); Zhaohua Lu, Shenzhen (CN); Chuangxin Jiang, Shenzhen (CN); Yuxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 341 days.

(21) Appl. No.: 18/433,606

(22) Filed: Feb. 6, 2024

(65) Prior Publication Data

US 2024/0243874 A1 Jul. 18, 2024

Related U.S. Application Data

(63) Continuation of application No. 17/494,505, filed on Oct. 5, 2021, now Pat. No. 11,916,834, which is a (Continued)

(30) Foreign Application Priority Data

Dec. 11, 2017 (CN) ......................... 201711311872.X

(51) Int. Cl.
*H04L 5/00* (2006.01)
*H04L 27/26* (2006.01)

(52) U.S. Cl.
CPC .......... *H04L 5/0051* (2013.01); *H04L 5/0048* (2013.01); *H04L 27/2613* (2013.01)

(58) Field of Classification Search
CPC ... H04L 5/0007; H04L 5/0048; H04L 5/0051; H04L 5/0073; H04L 27/2613

(Continued)

(56) References Cited

U.S. PATENT DOCUMENTS 8,792,584 B2 7/2014 Koo et al.
8,804,647 B2 * 8/2014 Ko ...................... H04L 27/2613 370/312

(Continued)

FOREIGN PATENT DOCUMENTS

CN 101741793 A 6/2010
CN 102572852 A 7/2012

(Continued)

OTHER PUBLICATIONS

3rd Generation Partnership Project, "Technical Specification Group Radio Access Network; Evolved Universal Terrestrial Radio Access (E-UTRA); Physical Channels and Modulation (Release 11)" Dec. 1, 2012, Valbonne, France (108 pages).

(Continued)

*Primary Examiner* — John Pezzlo
(74) *Attorney, Agent, or Firm* — Foley & Lardner LLP

(57) ABSTRACT

Disclosed is method and apparatus which includes: obtaining a sequence group number and/or a sequence number of a reference signal according to at least one of following pieces of information: the number N of time domain symbols included in a time unit in which the reference signal is located, a positive integer M, index information of time domain symbols in which the reference signal is located among N time domain symbols included in one time unit, index information of the time domain symbol in which the reference signal is located among M preset time domain symbols, a frame number of a frame in which the reference signal is located, the number B of time units included in the frame in which the reference signal is located, or a time unit index obtained according to a subcarrier spacing of a bandwidth part (BWP) in which the reference signal is located.

20 Claims, 4 Drawing Sheets

Related U.S. Application Data continuation of application No. 16/899,454, filed on Jun. 11, 2020, now Pat. No. 11,463,220, which is a continuation of application No. 16/525,250, filed on Jul. 29, 2019, now Pat. No. 10,693,611, which is a continuation of application No. PCT/CN2018/120401, filed on Dec. 11, 2018.

(58) Field of Classification Search
USPC ................................. 370/329, 430, 503, 252
See application file for complete search history.

(56) References Cited

U.S. PATENT DOCUMENTS

| | | | | |
|---|---|---|---|---|
| 9,025,560 | B2 | 5/2015 | Han et al. | |
| 9,154,270 | B2 | 10/2015 | Han et al. | |
| 9,444,596 | B2 | 9/2016 | Chung et al. | |
| 9,577,805 | B2 | 2/2017 | Chung et al. | |
| 9,674,824 | B2 | 6/2017 | Han et al. | |
| 9,729,290 | B2 | 8/2017 | Noh et al. | |
| 9,800,364 | B2 | 10/2017 | Noh et al. | |
| 9,807,758 | B2 | 10/2017 | Noh et al. | |
| 9,843,466 | B2 | 12/2017 | Ko et al. | |
| 9,923,686 | B2 | 3/2018 | Kim et al. | |
| 9,942,889 | B2 | 4/2018 | Noh et al. | |
| 10,439,779 | B2 | 10/2019 | Gong et al. | |
| 10,523,476 | B2 * | 12/2019 | Sun | H04L 27/2613 |
| 10,771,212 | B2 | 9/2020 | Ko et al. | |
| 10,873,489 | B2 | 12/2020 | Kim et al. | |
| 11,283,558 | B2 * | 3/2022 | Yang | H04L 5/0005 |
| 2009/0046645 | A1 | 2/2009 | Bertrand et al. | |
| 2011/0134867 | A1 | 6/2011 | Lee et al. | |
| 2012/0140717 | A1 | 6/2012 | Zhu et al. | |
| 2013/0121266 | A1 | 5/2013 | Ko et al. | |
| 2013/0201931 | A1 * | 8/2013 | Noh | H04L 27/2613 370/328 |
| 2013/0301452 | A1 | 11/2013 | Yoon | |
| 2015/0215936 | A1 | 7/2015 | Iwai et al. | |
| 2018/0076946 | A1 | 3/2018 | Li et al. | |
| 2018/0198648 | A1 | 7/2018 | Sun et al. | |
| 2019/0104007 | A1 | 4/2019 | Wang et al. | |
| 2020/0022127 | A1 | 1/2020 | Li et al. | |
| 2020/0163079 | A1 | 5/2020 | Choi et al. | |
| 2020/0404687 | A1 | 12/2020 | Yoshimura et al. | |
| 2021/0127358 | A1 | 4/2021 | Li et al. | |
| 2022/0086774 | A1 | 3/2022 | Qian et al. | |
| 2023/0109874 | A1 * | 4/2023 | Gan | H04L 27/2602 370/329 |

FOREIGN PATENT DOCUMENTS

| | | | |
|---|---|---|---|
| CN | 102696193 | A | 9/2012 |
| CN | 104137499 | A | 11/2014 |
| CN | 104639223 | A | 5/2015 |
| CN | 106105085 | A | 11/2016 |
| CN | 106358296 | A | 1/2017 |
| CN | 106375074 | A | 2/2017 |
| CN | 106817210 | A | 6/2017 |
| CN | 106961408 | A | 7/2017 |
| CN | 107295671 | A | 10/2017 |
| CN | 107370588 | A | 11/2017 |
| CN | 109905217 | B | 6/2019 |
| EP | 2 747 320 | A2 | 6/2014 |
| EP | 3 926 880 | B1 | 10/2025 |
| WO | WO-2016/179834 | A1 | 11/2016 |
| WO | WO-2019/098712 | A1 | 5/2019 |

OTHER PUBLICATIONS

CATT: "Discussion on remaining details of SRS design" 3GPP TSG RAN WG1 Meeting #91; R1-1720188; Dec. 1, 2017; Reno, USA (3 pages).
Ericsson, "Introduction of NB-IoT enhancements" 3GPP TSG-RAN1 Meeting #88, R1-1704134, Feb. 17, 2017, Athens, Greece (24 pages).
ETSI, "LTE; Evolved Universal Terrestrial Radio Access (E-UTRA); Physical channels and modulation" 3GPP TS 36.211 version 14.4.0, Release 14, Sophia Antipolis Cedex, France (199 pages).
Examination Search Report for CA Appl. No. 3085390, dated Apr. 11, 2022 (3 pages).
Extended European Search Report for EP Appl. No. 21182920.5, dated Oct. 22, 2021 (9 pages).
Extended European Search Report for European Application No. 18888629.5 mailed on Feb. 6, 2020 (9 pages).
Final Office Action on U.S. Appl. No. 17/494,505 Dtd Sep. 6, 2023.
First Office Action for CN Appl. No. 201711311872.X, dated Aug. 4, 2020 (with English translation, 15 pages).
First Office Action for CN Appl. No. 202110003154.6, dated Nov. 3, 2021 (with English translation, 10 pages).
First office Action for JP Appl. No. 2020-549858, dated Oct. 26, 2021 (with English translation, 12 pages).
First Office Action for KR Appl. No. 10-2022-7014311, dated Jun. 22, 2022 (with English translation, 9 pages).
First Office Action on CN Appl. No. 2020116205914, dated Sep. 29, 2021 (12 pages, including English translation).
Hou, Xiaolin et al. "DMRS Design and Channel Estimation for L TE-Advanced MIMO Uplink", IEEE, Dec. 31, 2009 (Dec. 31, 2009), https://doi.org/10.1109/VETECF.2009.5378829.
Huawei et al. "RI-156435. 3GPP TSG RAN WGI Meeting #83", Proposal for SRS Sequence Index for RPF=4, Nov. 22, 2015 (Nov. 22, 2015).
Huawei et al., "Remaining details of SRS design", 3GPP TSG RAN WG1 Meeting #91, R1-1719441, Dec. 1, 2017, Reno, USA (12 Pages).
Huawei et al.: "Remaining details on SRS design" 3GPP TSG RAN WG1 Meeting #91; R1-1719441; Dec. 1, 2017; Reno, USA (12 pages).
ID Office Action on P00202005058, dated Nov. 11, 2022 (with English translation, 6 pages).
Intel Corporation: "Discussion on SRS for NR" 3GPP TSG RAN WG1 Meeting 91; R1-1720078; Dec. 1, 2017; Reno, USA (6 pages).
International Search Report for International Application No. PCT/CN2018/120401 mailed on Feb. 27, 2019.
LG Electronics, "Design of short PUCCH for UGI of up to 2 bits for NR", vol. RAN WG1 Meeting 90bis, R1-1717956, Prague, CZ, Oct. 9-13, 2017 (8 pages).
LG Electronics, "On SRS design" 3GPP TSG RAN WG1 Meeting NR #91, R1-1719914, Dec. 1, 2017, Reno, USA (3 pages).
LG Electronics, "Support of short PUCCH over 2 OFDM symbols for NR" 3GPP TSG RAN WG1 Meeting 90bis, R1-1717958, Oct. 13, 2017, Prague, Czech (3 pages).
Mitsubishi Electric, "Views on SRS designs", vol. RAN WG1 #91, Reno, USA, Nov. 27-Dec. 1, 2017 (8 pages).
Non-Final Office Action on U.S. Appl. No. 16/899,454, mailed on Jan. 26, 2022 (15 pages).
Non-Final Office Action on U.S. Appl. No. 16/525,250 Dtd Nov. 6, 2019.
Non-Final Office Action on U.S. Appl. No. 17/494,505 Dtd May 12, 2023.
Notice of Allowance on U.S. Appl. No. 16/525,250 dated Feb. 12, 2020.
Notice of Allowance on U.S. Appl. No. 16/899,454 Dtd Jun. 2, 2022.
Notice of Allowance on U.S. Appl. No. 17/494,505 Dtd Dec. 22, 2023.
Office Action on CA Appl. No. 3,085,390, dated Jun. 29, 2021 (4 pages).
OPPO, "Further discussion on SRS design for NR" 3GPP TSG RAN WG1 Meeting#91, R1-1719967, Dec. 1, 2017, Reno, USA (5 pages).
Qualcomm Europe, "Hopping of UL DM-RS", 3GPP TSG RAN1 #52, R1-080963, Sorrento, Italy, Feb. 8, 2008 (9 pages).
Samsung et al.: "WF on SRS bandwidth configuration", 3GPP TSG RAN WG1 Meeting #91, R1-1721455, Dec. 27, 2017, 3 pages, Reno USA.

(56) References Cited

OTHER PUBLICATIONS

Samsung: "Remaining details on SRS" 3GPP TSG RAN WG1 Meeting #91; R1-1720313; Dec. 1, 2017; Reno, USA (9 pages).
Second Office Action for KR Appl. No. 10-2022-7014312, dated Jun. 23, 2022 (with English translation, 6 pages).
Second Office Action on CN Appl. No. 202110003154.6 mailed Jun. 30, 2022 (with English translation, 19 pages).
Sony, "Summary of SRS" 3GPP TSG RAN WG1 Meeting 91, R1-1721564, Dec. 1, 2017, Reno, USA (27 pages).
Sony, "Summary of SRS", 3GPP TSG RAN WG1 Meeting 91, R1-1721353, Reno, US, Nov. 28, 2017 (16 pages).
Third Office Action for CN Appl. No. 202110003154.6, dated Nov. 30, 2022 (with English translation, 8 pages).
Zte et al., "Remaining details on SRS" 3GPP TSG RAN WG1 Meeting 91, R1-1719544, Reno, USA (6 pages).
Zte et al.: "Remaining details on SRS" 3GPP TSG RAN WG1 Meeting 91; R1-1719544; Dec. 1, 2017; Reno, USA (6 pages).
First Substantive Examination Requirement Issued on MX Appl. No. MX/a/2024/000149 dated Mar. 2, 2026 (8 pages).
Office Action on BR Appl. No. BR112020011631-9 dated Jun. 25, 2026 (9 pages with English translation).

* cited by examiner

METHOD AND APPARATUS FOR TRANSMITTING A REFERENCE SIGNAL

CROSS-REFERENCE TO RELATED PATENT APPLICATIONS

This application claims the benefit of priority under 35 U.S.C. § 120 as a continuation of U.S. patent application Ser. No. 17/494,505, filed Oct. 5, 2021 which is a continuation of U.S. patent application Ser. No. 16/899,454, filed Jun. 11, 2020 which is a continuation of U.S. patent application Ser. No. 16/525,250, filed on Jul. 29, 2019, which is a continuation of PCT Patent Application No. PCT/CN2018/120401 filed on Dec. 11, 2018, which claims the priority of Chinese patent application No. 201711311872.X filed on Dec. 11, 2017, the disclosure of each of which is hereby incorporated by reference in its entirety.

TECHNICAL FIELD

The present disclosure relates to the field of communication technologies, for example, to a method and apparatus for transmitting a reference signal.

BACKGROUND

In the existing art, in the long term evolution (LTE) system, a channel sounding reference signal (SRS), as an uplink reference signal occupies one time domain symbol (may occupy more than one time domain symbol merely in a special uplink subframe or in a special uplink pilot time slot (UpPTS)) in a slot. The Zadoff Chu (ZC) sequence with better correlation performance is used for the SRS, and an acquisition parameter of a sequence group number u of the ZC sequence includes the subframe serial number, so that the sequence group number u changes with the subframe to achieve interference randomization.

Unlike in LTE, in the new radio (NR) system, an SRS resource may occupy more than one time domain symbol in a slot, so that an improvement solution considering a change of the sequence group number of the ZC sequence is needed so as to obtain a better interference randomization effect.

There is no effective solution to the problem, in the existing art, that the manner of determining the reference signal is not applicable to the new wireless system in which the sequence group number and/or the sequence number changes.

SUMMARY

The present disclosure provides a method and apparatus for transmitting a reference signal to at least solve the problem, in the existing art, that the manner of determining the reference signal is not applicable to the new wireless system in which the sequence group number and/or the sequence number changes. The requirements for the new wireless system in which the sequence group number and/or the sequence number changes can be met and thereby the interference between uplink measurement reference signals of cells is reduced.

The present disclosure provides a method for transmitting a reference signal. The method includes: obtaining a sequence group number and/or a sequence number of a reference signal according to at least one of following pieces of information: the number N of time domain symbols included in a time unit in which the reference signal is located; a positive integer M; index information of time domain symbols in which the reference signal is located among N time domain symbols included in one time unit; index information of the time domain symbol in which the reference signal is located among M preset time domain symbols; a frame number of a frame in which the reference signal is located; the number B of time units included in the frame in which the reference signal is located; or a time unit index obtained according to a subcarrier spacing of a bandwidth part (BWP) in which the reference signal is located;

determining the reference signal according to the sequence group number and/or the sequence number;

and transmitting the reference signal.

M satisfies a following condition: M is less than or equal to N, and is greater than or equal to A. A is the maximum number of time domain symbols allowed to be occupied by the reference signal in one time unit, or A is the number of time domain symbols occupied by the reference signal in one time unit.

The present disclosure further provides a method for transmitting a reference signal. The method includes: performing, according to signaling information or a pre-agreed rule, at least one of following operations: selecting a parameter set from a plurality of parameter sets, or selecting a formula from a plurality of formulas; determining, according to the selected parameter set and/or the selected formula, a sequence group number and/or a sequence number; determining a reference signal according to the sequence group number and/or the sequence number; and transmitting the reference signal.

The present disclosure further provides a method for sending signaling. The method includes: sending signaling information to a second communication node. The signaling information is used for instructing the second communication node to perform at least one of following operations: selecting a first parameter set from at least one parameter set, or selecting a first formula from at least one formula; and determining a reference signal according to the first parameter and/or the first formula.

The present disclosure further provides a method for transmitting a reference signal. The method includes: determining, according to signaling information or an agreed rule, a manner of obtaining a parameter for generating at least one of a sequence group number or a sequence number; determining the parameter according to the obtaining manner; generating the sequence group number and/or the sequence number according to the parameter; determining the reference signal according to the sequence group number and/or the sequence number; and transmitting the reference signal.

The present disclosure further provides an apparatus for transmitting a reference signal. The apparatus includes: a first obtaining module, which is configured to obtain a sequence group number and/or a sequence number of a reference signal according to at least one of following pieces of information: the number N of time domain symbols included in a time unit in which the reference signal is located; a positive integer M; index information of time domain symbols in which the reference signal is located among N time domain symbols included in one time unit; index information of the time domain symbol in which the reference signal is located among M preset time domain symbols; a frame number of a frame in which the reference signal is located; the number B of time units included in the frame in which the reference signal is located; or a time unit index obtained according to a subcarrier spacing of a bandwidth part (BWP) in which the reference signal is located;

a first determination module, which is configured to determine the reference signal according to the sequence group number and/or the sequence number; and a first transmission module, which is configured to transmit the reference signal.

M satisfies a following condition: M is less than or equal to N, and is greater than or equal to A. A is the maximum number of time domain symbols allowed to be occupied by the reference signal in one time unit, or A is the number of time domain symbols occupied by the reference signal in one time unit.

The present disclosure further provides an apparatus for transmitting a reference signal. The apparatus includes: a performing module, which is configured to perform, according to signaling information or a pre-agreed rule, at least one of following operations: selecting a parameter set from a plurality of parameter sets, or selecting a formula from a plurality of formulas; a second determination module, which is configured to determine, according to the selected parameter set and/or the selected formula, a sequence group number and/or a sequence number; a third determination module, which is configured to determine the reference signal according to the sequence group number and/or the sequence number; and a second transmission module, which is configured to transmit the reference signal.

The present disclosure further provides an apparatus for transmitting a reference signal. The apparatus includes: a fourth determination module, which is configured to determine, according to signaling information or an agreed rule, a manner of obtaining a parameter for generating a sequence group number and/or a sequence number; a fifth determination module, which is configured to determine the parameter according to the obtaining manner; a first generation module, which is configured to generate the sequence group number and/or the sequence number according to the parameter; a sixth determination module, which is configured to determine the reference signal according to the sequence group number and/or the sequence number; and a third transmission module, which is configured to transmit the reference signal.

The present disclosure further provides a storage medium. The storage medium includes stored programs which, when executed, perform any method described above.

The present disclosure further provides a processor. The processor is configured to execute programs which, when executed, perform any method described above.

DETAILED DESCRIPTION

Embodiments of the present disclosure provide a mobile communication network (which includes, but is not limited to the fifth-generation (5G) mobile communication network). The network architecture of the network may include a network side device (such as a base station) and a terminal. The embodiments provide an information transmission method executable on the network architecture described above. The operating environment of the above-described method for transmitting a reference signal provided in the embodiments is not limited to the above network architecture.

The method provided in the embodiments of the present disclosure may be performed by the terminal or the base station side. Both the terminal and the base station side may perform the method provided in the present disclosure.

A time unit described in the present disclosure is a slot, or a subframe, or a time domain symbol of a first subcarrier spacing. The time domain symbol of the first subcarrier spacing includes Q second subcarrier time domain symbols. Q is a positive integer greater than or equal to 1. Another time unit may also be provided as the time unit.

Embodiment One

Figure 1:
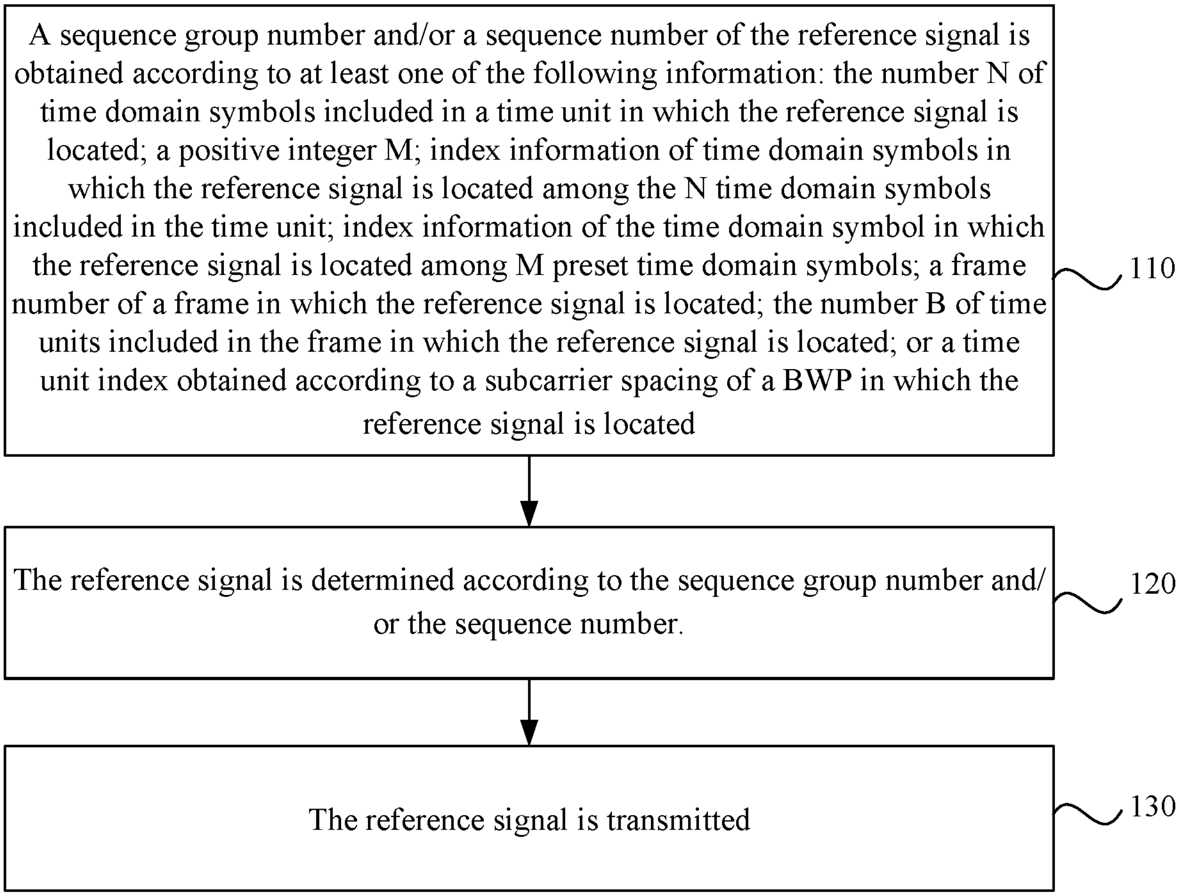
FIG. 1 is a schematic flowchart of a method for transmitting a reference signal according to an embodiment.

An embodiment of the present disclosure provides a method for transmitting a reference signal. Referring to FIG. 1, the method provided by the embodiment includes steps 110, 120 and 130.

In the step 110, a sequence group number and/or a sequence number of the reference signal is obtained according to at least one of following pieces of information: the number N of time domain symbols included in a time unit in which the reference signal is located; a positive integer M; index information of time domain symbols in which the reference signal is located among N time domain symbols included in one time unit; index information of the time domain symbol in which the reference signal is located among M preset time domain symbols; a frame number of a frame in which the reference signal is located; the number B of time units included in the frame in which the reference signal is located; or a time unit index obtained according to a subcarrier spacing of a BWP in which the reference signal is located.

In the embodiment, M satisfies the following condition: M is less than or equal to N, and is greater than or equal to A. A is the maximum number of time domain symbols allowed to be occupied by the reference signal in one time unit, or A is the number of time domain symbols occupied by the reference signal in one time unit. In the embodiment, when the reference signal is a measurement reference signal, the reference signal refers to a measurement reference signal resource, such as an SRS resource.

In the step 120, the reference signal is determined according to the sequence group number and/or the sequence number.

In the step 130, the reference signal is transmitted.

In the embodiment, transmitting the reference signal may include sending or receiving the reference signal.

In the embodiment, the execution order of the step 110, the step 120, and the step 130 may be interchangeable, that is, the order of the step 110, the step 120, and the step 130 is not limited.

Through the above steps, the sequence group number and/or the sequence number of the reference signal is obtained according to at least one of the recorded information in the embodiment: the reference signal is determined according to the sequence group number and/or the sequence number; and the reference signal is transmitted. Thus, the problem, in the existing art, that the manner of determining the reference signal is not applicable to the new wireless system in which the sequence group number and/or the sequence number changes is solved, a manner of determining the reference signal and that is applicable to the new wireless system is provided, and requirements for the new wireless system in which the sequence group number and/or the sequence number changes can be met.

In an embodiment, M is determined according to one of following pieces of information: the number of time domain symbols included in a time domain symbol set allowed to be occupied by the reference signal in one time unit; the maximum value of the number of time domain symbols occupied by the reference signal in one time unit; or a distance between a time domain symbol having the largest index and a time domain symbol having the smallest index in the time domain symbol set allowed to be occupied by the reference signal in one time unit. The index is an index of a time domain symbol in the time domain symbol set included in the time unit.

In an embodiment, N and/or M are determined in one of the following manners: N and/or M are carried in received signaling information; or N and/or M are pre-agreed.

In an embodiment, the step of determining the reference signal according to the sequence group number and/or the sequence number includes determining the reference signal through the following manner:

$$r_{u,v}^{(\alpha,\delta)}(n) = e^{j\alpha\left(n+\delta\frac{\omega mod2}{2}\right)}\overline{r}_{u,v}(n),$$

Where u is the sequence group number, $$r_{u,v}^{(\alpha,\delta)}$$

is the reference signal, $$M_{SC}^{RS}$$

is a length of the reference signal, δ is the total number of comb levels of an interleaved frequency division multiple access (IFDMA) or δ is 0, and ω belongs to {0, 1}. In condition that $$M_{SC}^{RS}$$

is greater than a predetermined threshold:

$$\overline{r}_{u,v}(n) = x_q\left(n \bmod N_{zc}^{RS}\right),\ n = 0, 1, \ldots, M_{SC}^{RS} - 1;$$

$$x_q(m) = e^{-j\frac{\pi q m(m+1)}{N_{zc}^{RS}}},$$

m=0, 1, . . . , $$N_{zc}^{RS} - 1;\ q = \lfloor \overline{q} + 1/2 \rfloor + v \times (-1)^{\lfloor 2\overline{q} \rfloor};$$

and $$\overline{q} = N_{zc}^{RS}(u+1)/31$$

v is the sequence number and belongs to {0, 1}, 0≤α≤2π, and $$N_{zc}^{RS}$$

is a largest prime number less than $$M_{SC}^{RS}.$$

In condition that $$M_{SC}^{RS}$$

is less than or equal to the predetermined threshold, $$\overline{r}_{u,v}(n) = e^{j\varphi(n)\pi/4},\ n = 0, 1, \ldots, M_{SC}^{RS} - 1.$$

Where φ(n) is obtained by searching a preset table according to the sequence group number u, and v is 0.

In the embodiment, for the total number of comb levels of the IFDMA, for example, the reference signal occupies one RE per b resource elements (REs) in the orthogonal frequency division multiplexing (OFDM), then the total number of comb levels is b.

In an embodiment, index information of time domain symbols in which the reference signal is located in a time domain symbol set included in one time unit is sequentially increased from back to front in chronological order. The indexes may be numbered from the end position, similar to numbering in reverse order.

In an embodiment, the sequence group number of the reference signal is obtained through the following manner: the sequence group number u=($f_{gh}$(x)+$f_{ss}$)mod C; or the sequence group number u is obtained according to $f_{gh}$(x).

Where $f_{gh}$(x) is a function with respect to x, x includes at least one of the information, C is the total number of sequence groups, and $f_{ss}$ is obtained according to an agreed rule and/or a parameter included in received signaling information.

In the embodiment, the at least one of the information included in x is relevant information used for determining the sequence number in the step one.

In an embodiment, $$f_{gh}(x) = \left(\sum_{l=0}^{D-1} c(D*h(x)+i)*2^{i}\right) \bmod C.$$

Where h(x) is a function with respect to x. x includes at least one of the information, and/or x includes a time unit index of the time unit in one frame. D is an integer greater than or equal to 8, c(z) is the z-th value in a sequence generated by a random sequence function c( ), and z is a non-negative integer.

In the embodiment, the at least one of the information included in x is relevant information used for determining the sequence group number in the step one. x may further include a time unit index of the time unit in which the reference signal is located in one frame.

In an embodiment, at least one of the following characteristics is satisfied: D is carried in the received signaling information; c( ) is a pseudo-random random sequence generation function; in condition that a value of C is greater than 30, D is greater than 8;

$$D \geq \lceil \log_2(C) \rceil + \left\lceil \log_2\left(\frac{C}{x_1}\right) \right\rceil - 1;\ D \geq \lceil \log_2(C) \rceil - 1;$$

when $$x_1 > 0,\ D \geq \lceil \log_2(C) \rceil + \left\lceil \log_2\left(\frac{C}{x_1}\right) \right\rceil - 1;$$

or when $x_1=0$, $D \geq \lceil \log_2(C) \rceil - 1$.

In an embodiment, h(x) satisfies one of the following formulas: $h(l_1, M, n_s)=l_1+n_s*M$; $h(l_1, M, n_s, n_f)=l_1+n_s*M+B*n_f*M$; $h(l_2, N, n_s)=l_2+n_s*N$; and $h(l_2, N, n_s, n_f)=l_2+n_s*N+B*n_f*N$.

Where $l_1$ is index information of time domain symbols in which the reference signal is located in a set including M preset time domain symbols, $0 \leq l_1 < M$, $l_2$ is index information of the time domain symbol in which the reference signal is located among N time domain symbols included in one time unit, $0 \leq l_2 < N$, and $$n'_f = n_f \text{ or } n'_f = n_f \bmod (E).$$

Where $n_f$ is a frame number of a frame in which the reference signal is located, E is a predetermined value, and $n_s$ is a time unit index obtained according to a subcarrier spacing of a BWP in which the reference signal is located or $n_s$ is an index of a time unit in which the reference signal is located in one frame.

In an embodiment, the reference signal includes at least one of: a measurement reference signal, a demodulation reference signal, or a control channel frequency domain spreading sequence.

In an embodiment, the step of obtaining the sequence number according to the information includes: in a case of sequence hopping, the sequence number v satisfies $v=c(z_1)$. Where $z_1$ is obtained according to at least one of the information; c(z) is the z-th value in a sequence generated by a random sequence function c( ), and z is a non-negative integer.

In an embodiment, $z_1$ is obtained according to one of the following formulas:

$$z_1 = n_s*N + l_2;\ z_1 = n_s*M + l_1;$$

$$z_1 = n_s*N + l_2 + B*N*n'_f; \text{ or } z_1 = n_s*M + l_1 + B*M*n'_f.$$

$l_1$ is the index information of the time domain symbol in which the reference signal is located in the set including the M preset time domain symbols, $0 \leq l_1 < M$ is the index information of the time domain symbol in which the reference signal is located among the N time domain symbols included in one time unit, $$0 \leq l_2 < N, \text{ and } n'_f = n_f \text{ or } n'_f = n_f \bmod (E).$$

$n_f$ is the frame number of the frame in which the reference signal is located, E is the predetermined value, and $n_s$ is the time unit index obtained according to the subcarrier spacing of the BWP in which the reference signal is located or $n_s$ is the index of the time unit in which the reference signal is located in one frame.

Another embodiment of the present disclosure further provides a method for transmitting a reference signal. The method includes steps described below.

In a step 1, at least one of the following operations: selecting a parameter set from a plurality of parameter sets or selecting a formula from a plurality of formulas is performed according to signaling information or a pre-agreed rule.

In a step 2, a sequence group number and/or a sequence number are determined according to the selected parameter set and/or the selected formula.

In a step 3, the reference signal is determined according to the sequence group number and/or the sequence number.

In a step 4, the reference signal is transmitted. Transmission includes sending or reception.

In an embodiment, the execution order of the step 1, the step 2, the step 3, and the step 4 may be interchangeable, that is, the order of the step 1, the step 2, the step 3, and the step 4 is not limited in implementation of the solution.

With the above solution, the problem, in the existing art, that the manner of determining the reference signal is not applicable to the new radio system in which the sequence group number and/or the sequence number changes is solved, a manner of determining the reference signal and that is applicable to the new wireless system is provided, and requirements for the new wireless system the sequence group number and/or the sequence number changes can be met.

In an embodiment, the plurality of parameter sets at least includes a first parameter set and a second parameter set.

In an embodiment, the first parameter set at least includes one of the following parameters: the number L of time domain symbols occupied by the reference signal in one time unit, index information of time domain symbols occupied by the reference signal among the L time domain symbols, or a time unit index obtained according to a subcarrier spacing of a BWP in which the reference signal is located.

The second parameter set at least includes one of the following parameters: the number N of time domain symbols included in a time unit in which the reference signal is located; a positive integer M; index information of time domain symbols in which the reference signal is located in one time unit; index information of the time domain symbol in which the reference signal is located among M preset time domain symbols; a frame number of a frame in which the reference signal is located; a number B of time units included in the frame in which the reference signal is located; or a time unit index obtained according to a sub-carrier spacing of a BWP in which the reference signal is located.

In the embodiment, the above parameter set at least includes one parameter.

In an embodiment, the plurality of parameter sets at least includes a third parameter set and a fourth parameter set. The third parameter set includes time domain symbol index information, and the fourth parameter set does not include the time domain symbol index information.

In an embodiment, N and/or M are determined according to one of the following manners: N and/or M are carried in received signaling information; or N and/or M are pre-agreed.

In an embodiment, the step of determining the reference signal according to the sequence group number and/or the sequence number includes determining the reference signal in the following manner:

$$r_{u,v}^{(\alpha,\delta)}(n) = e^{j\alpha\left(n+\delta\frac{\omega mod2}{2}\right)}\bar{r}_{u,v}(n),$$

$$0 \le n < M_{SC}^{RS} - 1$$

Where u is the sequence group number, $$r_{u,v}^{(\alpha\cdot\beta)}$$

is the reference signal, $$M_{SC}^{RS}\ r_{u,v}^{(\alpha\cdot\beta)}$$

is a length of the reference signal, δ is the total number of comb levels of an IFDMA or v is 0, and ω belongs to {0, 1}. In condition that is greater than a predetermined threshold:

$$\bar{r}_{u,v}(n) = x_q\left(n \bmod N_{zc}^{RS}\right),\ n = 0, 1, \ldots, M_{SC}^{RS} - 1;$$

$$x_q(m) = e^{-j\frac{\pi q m(m+1)}{N_{zc}^{RS}}},$$

m=0, 1, . . . , $$N_{zc}^{RS} - 1;$$

$q=\lfloor\bar{q}+1/2\rfloor+v\times(-1)^{\lfloor 2\bar{q}\rfloor}$; and $$\bar{q} = N_{zc}^{RS}(u+1)/31.$$

v is the sequence number and belongs to {0, 1}, $0\le\alpha\le2\pi$, and $$N_{zc}^{RS} 0 \le \alpha \le 2\pi$$

is a largest prime number less than $$M_{SC}^{RS}\ N_{zc}^{RS}.$$

In condition that $$M_{SC}^{RS}$$

is less than or equal to the predetermined threshold, $\bar{r}_{u,v}(n)=e^{j\varphi(n)\pi/4}$, n=0, 1, . . . , $$M_{SC}^{RS} - 1_{\varphi(n)}$$

is obtained by searching a preset table according to the sequence group number u, and v is 0.

In an embodiment, the sequence group number of the reference signal is obtained in the following manner: the sequence group number $u=(f_{gh}(x)+f_{ss}) \bmod C$; or the sequence group number u is obtained according to $f_{gh}(x)$.

wherein $f_{gh}(x)$ is a function with respect to x, x comprises at least one of the information, C is a total number of sequence groups, and $f_{ss}$ is obtained according to an agreed rule and/or a parameter included in received signaling information.

In an embodiment, $f_{gh}(x) = \left(\sum_{I=0}^{D-I} c(D*h(x)+i)*2^i\right) \bmod C.$ Where h(x) is a function with respect to x. x includes at least one of the information, and/or x includes an index of the time unit in one frame. D is an integer greater than or equal to 8, c(z) is a z-th value in a sequence generated by a random sequence function c( ), and z is a non-negative integer.

In an embodiment, at least one of the following characteristics is satisfied in the above-mentioned embodiment. D is carried in the received signaling information; c( ) is a pseudo-random random sequence generation function. In condition that a value of C is greater than 30, D is greater than 8

$$D \ge \lceil \log_2(C) \rceil + \left\lceil \log_2\left(\frac{C}{x_1}\right) \right\rceil - 1;$$

$D\ge\lceil\log_2(C)\rceil-1$; when $x_1>0$, $$D \geq \lceil \log_2(C) \rceil + \left\lceil \log_2\left(\frac{C}{x_1}\right) \right\rceil - 1;$$

when $x_1=0$, $D \geq \lceil \log_2(C) \rceil - 1$.

In an embodiment, h(x) satisfies one of the following formulas: $h(l_1, M, n_s)=l_1+n_s*M$; $h(l_1, M, n_s, n_f)=l_1+n_s*M+B*n_f*M$; $h(l_2, N, n_s)=l_2+n_s*N$; and $h(l_2, N, n_s, n_f)=l_2+n_s*N+B*n_f*N$.

Where $l_1$ is the index information of the time domain symbol in which the reference signal is located in the set including the M preset time domain symbols, $l_2$ is the index information of the time domain symbol in which the reference signal is located among the N time domain symbols included in one time unit, and $$n'_f = n_f \text{ or } n'_f = n_f \bmod(E).$$

$n_f$ is the frame number of the frame in which the reference signal is located, E is the predetermined value, and $n_s$ is the time unit index obtained according to the subcarrier spacing of the BWP in which the reference signal is located or $n_s$ is the index of the time unit in which the reference signal is located in one frame.

In an embodiment, the formula is used for describing the hopping rules of the sequence group number and/or the sequence number.

In an embodiment, a hopping formula of the sequence group number includes at least one of: $h(l_0, L, n_s)=l_0+n_s*L$; $h(l_1, M, n_s)=l_1+n_s*M$; $h(l_1, M, n_s, n_f)=l_1+n_s*M+B*n_f*M$; $h(l_2, N, n_s)=l_2+n_s*N$; and $h(l_2, N, n_s, n_f)=l_2+n_s*N+B*n_f*N$. A hopping formula of the sequence number v satisfies $v=c(z_1)$. $z_1$ is obtained according to one of following formulas:

$$z_1 = n_s * N + l_2;\ z_1 = n_s * M + l_1;\ z_1 = n_s * N + l_2 + B * N * n'_f; \text{ or}$$
$$z_1 = n_s * M + l_1 + B * M * n'_f.$$

Where $l_1$ is index information of time domain symbols in which the reference signal is located in a set including M preset time domain symbols, $l_2$ is index information of the time domain symbol in which the reference signal is located among N time domain symbols included in one time unit, and $$n'_f = n_f \text{ or } n'_f = n_f \bmod(E).$$

$n_f$ is a frame number of a frame in which the reference signal is located, E is a predetermined value, B is the number of time units included in the frame in which the reference signal is located, and $n_s$ is a time unit index obtained according to a subcarrier spacing of a BWP in which the reference signal is located or $n_s$ is an index of a time unit in which the reference signal is located in one frame.

The sequence group number u satisfies $$u = (f_{gh}(x) + f_{ss}) \bmod C,\ f_{gh}(x) = \left(\sum_{i=0}^{D-1} c(D * h(x) + i) * 2^i\right) \bmod C,\ f_{gh}(x)$$

is a function with respect to x, x includes at least one of the information, and c is the total number of sequence groups. D is an integer greater than or equal to 8. c(z) is the z-th value in a random sequence generated by a random sequence function c( ), and z is a non-negative integer. h(x) is a function with respect to x, and x includes at least one of the information, and/or x includes an index of the time unit in the frame.

In an embodiment, the step of obtaining the sequence number according to the parameter includes: in a case of sequence hopping, the sequence number v satisfies $v=c(z_1)$. $z_1$ is obtained according to the parameter; c(z) is the z-th value in a sequence generated by a random sequence function c( ), and z is a non-negative integer.

In an embodiment, t, $z_1$ is obtained according to one of the following formulas:

$$z_1 = n_s * N + l_2;\ z_1 = n_s * M + l_1;\ z_1 = n_s * N + l_2 + B * N * n'_f; \text{ or}$$
$$z_1 = n_s * M + l_1 + B * M * n'_f.$$

$l_1$ is index information of time domain symbols in which the reference signal is located in a set including M preset time domain symbols, $0 \leq l_1 < M$, $l_2$ is index information of the time domain symbol in which the reference signal is located among N time domain symbols included in one time unit, $$0 \leq l_2 < N, \text{ and } n'_f = n_f \text{ or } n'_f = n_f \bmod(E).$$

$n_f$ is a frame number of a frame in which the reference signal is located, E is the predetermined value, and $n_s$ is a time unit index obtained according to a subcarrier spacing of a BWP in which the reference signal is located or $n_s$ is an index of a time unit in which the reference signal is located in one frame.

Another embodiment of the present disclosure further provides a method for sending signaling. The method may, and may not necessarily, be applied to a base station side. The method includes the steps described below.

In a step 1, signaling information is sent to a second communication node. The signaling information is used for instructing the second communication node to perform at least one of the following operations: selecting a first parameter set from at least one parameter set, or selecting a first formula from at least one formula; and determining a reference signal according to the first parameter and/or the first formula.

Another embodiment of the present disclosure further provides a method for transmitting a reference signal. The method includes steps described below.

In a step 1, a manner of obtaining a parameter for generating a sequence group number and/or a sequence number is determined according to signaling information or an agreed rule.

In a step 2, the parameter is determined according to the obtaining manner.

In a step 3, the sequence group number and/or the sequence number are generated according to the parameter.

In a step 4, the reference signal is determined according to the sequence group number and/or the sequence number.

In a step 5, the reference signal is transmitted. Transmission may include sending or receiving the reference signal.

In an embodiment, the execution order of the step 1, the step 2, the step 3, the step 4 or the step 5 is interchangeable, that is, the order of the step 1, the step 2, the step 3, the step 4 and the step 5 is not limited in implementation of the solution.

With the above solution, the problem, in the existing art, that the manner of determining the reference signal is not applicable to the change of the sequence group number and/or the sequence number in the new wireless system is solved, a manner of determining the reference signal and that is applicable to the new wireless system is provided, and requirements of the change of the sequence group number and/or the sequence number in the new wireless system can be met.

In an embodiment, the parameter for determining the sequence group number and/or the sequence number includes at least one of: a time domain symbol index or the number of time domain symbols.

In an embodiment, a manner of obtaining the time domain symbol index at least includes two of the following obtaining manners. The time domain symbol index is an index of a time domain symbol in which the reference signal is located among L time domain symbols. L is the number of time domain symbols occupied by the reference signal in one time unit.

The time domain symbol index is an index of a time domain symbol in which the reference signal is located among N time domain symbols. N is the number of time domain symbols included in a time unit in which the reference signal is located.

The time domain symbol index is an index of a time domain symbol in which the reference signal is located among M time domain symbols. M is the number of time domain symbols included in a time domain symbol set allowed to be occupied by the reference signal in one time unit.

In an embodiment, a manner of obtaining the number of time domain symbols at least includes two of the following obtaining manners.

The number of time domain symbols is the number of time domain symbols occupied by the reference signal in one time unit. In the embodiment, when the reference signal is a measurement reference signal, the reference signal refers to a reference signal resource.

The number of time domain symbols is the number of time domain symbols included in a time unit in which the reference signal is located.

The number of time domain symbols is the number of time domain symbols included in a time domain symbol set allowed to be occupied by the reference signal in one time unit.

Description will be made below in conjunction with the exemplary embodiments.

Exemplary Embodiment One

In the embodiment, a Zadoff-Chu (ZC) sequence is used for the uplink sounding reference signal (SRS) when the length of the SRS is greater than a predetermined threshold, and a predetermined sequence is used when the sequence length of the SRS is less than or equal to the predetermined threshold.

In the embodiment, in LTE, the SRS reference signal $$r_{u,v}^{(\alpha,\delta)}(n)$$

is obtained by the following formula:

$$r_{u,v}^{(\alpha,\delta)}(n) = e^{j\alpha\left(n+\delta\frac{\overline{\omega} \bmod 2}{2}\right)}\overline{r}_{u,v}(n),$$

$$0 \le n < M_{sc}^{RS}.$$

$$M_{sc}^{RS} = mN_{sc}^{RB}/2^{\delta}$$

is the sequence length of the SRS, m is the number of physical resource blocks (PRBs) occupied by the SRS, δ is the total number of comb levels in the IFDMA manner, α is a cyclic shift parameter, and ω belongs to {0, 1} or is fixed as 0.

When the sequence length $$M_{SC}^{RS}$$

of the SRS is greater than $$2N_{SC}^{NB}(N_{SC}^{NB}$$

is the number of subcarriers included in a PRB, for example, in LTE and NR, $$N_{SC}^{NB}$$

is 12), $$\overline{r}_{u,v}(n) = x_q(n \bmod N_{zc}^{RS}),\ n = 0, 1, \ldots, M_{SC}^{RS} - 1,$$

$$x_q(m) = e^{-j\frac{\pi q m(m+1)}{N_{zc}^{RS}}},$$

m=0, 1, . . . , $$N_{zc}^{RS} - 1;$$

$q=\lfloor \overline{q}+1/2 \rfloor+v\times(-1)^{\lfloor 2\overline{q} \rfloor}$; and $$\overline{q} = N_{zc}^{RS}(u+1)/31.$$

v is the sequence number and belongs to {0, 1}, 0≤α≤2π, and $N_{zc}^{RS}$ is the largest prime less than $M_{SC}^{RS}$.

In an embodiment, when the number of PRBs occupied by the SRS is less than 6, v is 0. When the number of PRBs occupied by the SRS is greater than or equal to 6, v may be 0 or 1.

When the sequence length $M_{SC}^{RS}$ of the SRS is less than or equal to $$2N_{SC}^{NB},\ \bar{r}_{u,v}(n) = e^{j\varphi(n)\pi/4},\ n = 0, 1, \ldots, M_{SC}^{RS} - 1.$$

φ(n) is obtained by searching a preset table according to the sequence group number u.

u is the sequence group number and is obtained by the following formula.

-continued $$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

$$n = 0, 1, \ldots, M_{PN} - 1,\ N_C = 1600,\ x_1(0) = 1,$$

$$x_1(n) = 0,\ n = 1, 2, \ldots, 30,\ c_{init} = \sum_{i=0}^{30} x_2(i) \cdot 2^i.$$

It may be seen from formula (2) that when the sequence group number hopping is enabled, the acquisition information of the sequence group number includes the subframe serial number $n_s$. One SRS resource in the NR may include more than one time domain symbol in one slot. Thereby, the acquisition of the above sequence group number may be improved. The sequence group number and/or the sequence number are obtained according to at least one of following pieces of information. The information is the number N of time domain symbols included in a time unit; a positive integer M; index information of time domain symbols in which the reference signal is located among N time domain symbols included in one time unit; index information of the time domain symbol in which the reference signal is located among M preset time domain symbols; a frame number of a frame in which the reference signal is located; or the number B of time units included in one frame. M is a positive integer less than or equal to N and is greater than or equal to A. A is the maximum number of time domain symbols allowed to be occupied by the reference signal in one time unit, or A is the number of time domain symbols occupied by the reference signal in one time unit.

$$u = (f_{gh}(n_s) + f_{ss}) \bmod 30. \quad (1)$$

$$f_{gh}(n_s) = \begin{cases} 0 & \text{If grouping number hopping is disabled} \\ \left(\sum_{I=0}^{7} C(8n_s + i) * 2^i\right) \bmod 30 & \text{If grouping number hopping is disabled} \end{cases}. \quad (2)$$

c(z) is the z-th value in the Pseudo-random random sequence. Once an initialization value is given, a random sequence can be generated. The initialization value in the sequence generation is $$c_{init} = \left\lfloor \frac{n_{ID}^{RS}}{30} \right\rfloor,$$

$$f_{ss} = n_{ID}^{RS} \bmod 30, \text{ and } n_{ID}^{RS}$$

is a parameter configured by the higher-layer or a physical cell identification number.

A length-31 Pseudo-random random sequence is generated in the following manner.

$$c(n) = (x_1(n + N_C) + x_2(n + N_C)) \bmod 2$$

Figure 3:
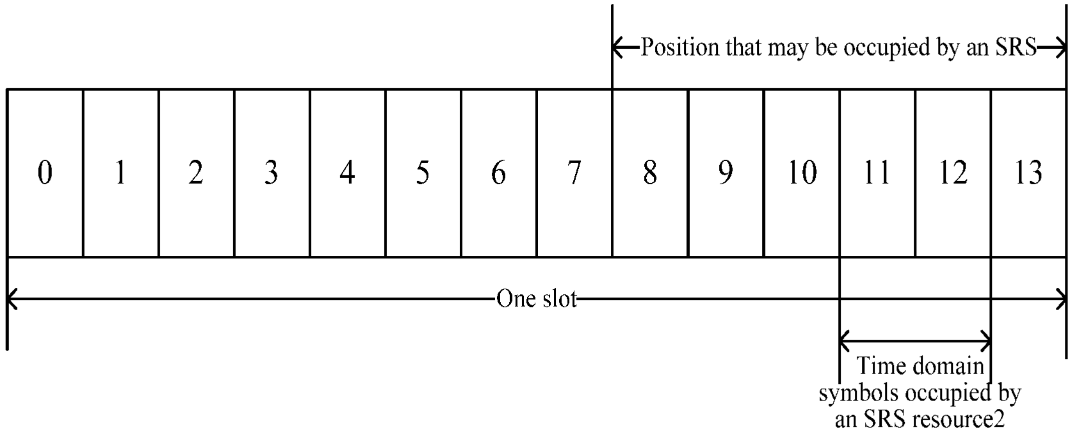
FIG. 3 is a schematic diagram of a time domain symbol position occupied by an SRS resource 2 in a slot according to the embodiment.

For example, the number of time domain symbols that an SRS resource may occupy in a slot is {1, 2, 4}. FIG. 3 is a schematic diagram of a time domain symbol position occupied by an SRS resource2 in a slot according to an embodiment. As shown in FIG. 3, the SRS resource 2 occupies two time domain symbols in one slot. A is 2, and then A is the number of time domain symbols occupied by the SRS resource2 in one slot. Or A is 4, and then A is the maximum number of time domain symbols allowed to be occupied by the SRS in one slot.

In an embodiment, the sequence number is obtained by using the following formula.

$$f_{gh}(n_s) = \begin{cases} 0 & \text{If grouping number hopping is disabled} \\ \left(\sum_{I=0}^{7} c(8h(\ ) + i) * 2^i\right) \bmod 30 & \text{If grouping number hopping is disabled} \end{cases} \quad (1\text{-}0)$$

Or when group hopping is enabled, $$f_{gh}(x) = \left(\sum_{I=0}^{D-1} c(D * h(\ ) + i) * 2^i\right) \bmod C.$$

C is the total number of sequence groups, and D satisfies at least one of the following four characteristics.

Characteristic 1: in condition that a value of C is greater than 30, D is greater than 8.

Characteristic 2:

$$D \geq \lceil \log_2(C) \rceil + \left\lceil \log_2\left(\frac{C}{x_1}\right) \right\rceil - 1.$$

Characteristic 3: $D \geq \lceil \log_2(C) \rceil - 1$.

Characteristic 4:

$$\text{when } x_1 > 0,\ D \geq \lceil \log_2(C) \rceil + \left\lceil \log_2\left(\frac{C}{x_1}\right) \right\rceil - 1;$$

and when $x_1=0$, $D \geq \lceil \log_2(C) \rceil - 1$. Where $x_1 = 2^{\lceil \log_2(C) \rceil} - C$.

h( ) is a function and may be one of the following formulas, or h( ) in the manner of obtaining the sequence number is indicated through signaling to be a formula in a formula set formed by more than one of the following formulas. For example, the formula set is {(3-1), (3-2)}, and then h( ) is indicated through signaling to be one of the formula (3-1) or the formula (3-2). Or the formula set is {(3-1), (3-2), (3-3), (3-4)}, and then h( ) is indicated through signaling to be one of the formula (3-1), the formula (3-2), the formula (3-3), or the formula (3-4).

$$h(l_1, M, n_s) = l_1 + n_s * M, \tag{3-1}$$

$$h(l_1, M, n_s, n_f) = l_1 + n_s * M + B * n'_f * M; \tag{3-2}$$

$$h(l_2, N, n_s) = l_2 + n_s * N; \tag{3-3}$$

$$h(l_2, N, n_s, n_f) = l_2 + n_s * N + B * n'_f * N \tag{3-4}$$

Or when the sequence hopping is enabled, the sequence number $v=c(z_1)$ $z_1$ is obtained by using one of the following formulas.

$$z_1 = l_1 + n_s * M \tag{3-1B}$$

$$z_1 = l_1 + n_s * M + B * n'_f * M \tag{3-2B}$$

$$z_1 = l_2 + n_s * N \tag{3-3B}$$

$$z_1 = l_2 + n_s * N + B * n'_f * N \tag{3-4B}$$

In the formula {(3-2), (3-4), (3-2B), (3-4B)}, B is the number of slots included in one frame, $$n'_f = n_f \text{ or } n'_f = n_f \bmod(E).$$

Figure 6:
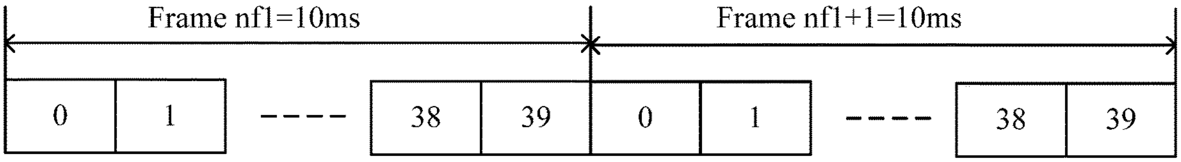
FIG. 6 is a schematic diagram of a frame including 40 slots according to an embodiment.

$n_f$ is the frame number of the frame in which the reference signal is located, or may also be referred to as the frame index. FIG. 6 is a schematic diagram of a frame including 40 slots according to an embodiment. As shown in FIG. 6, one frame corresponds to 10 ms, one frame includes 40 slots, and then B is equal to 40. E is a predetermined value. In an embodiment, E is an integer multiple of C.

Figure 2:
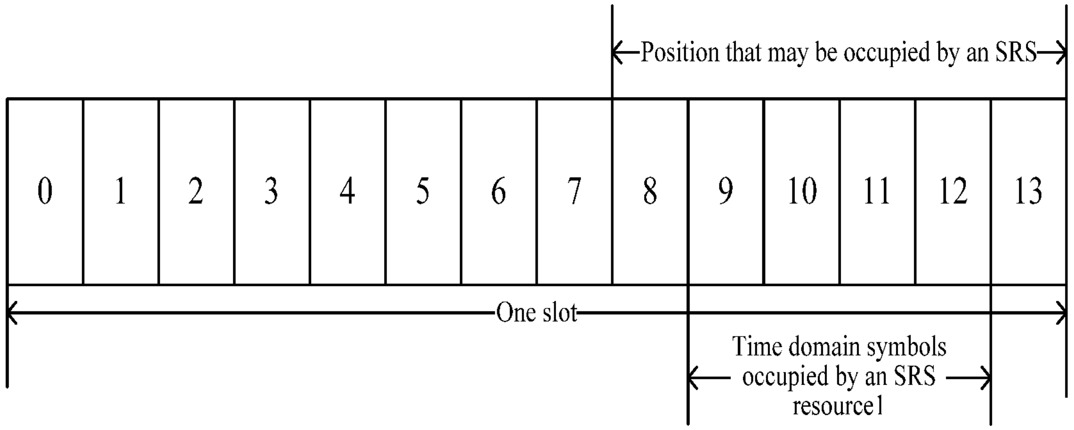
FIG. 2 is a schematic diagram of a time domain symbol position occupied by an SRS resource 1 in a slot according to an embodiment.
Figure 4:
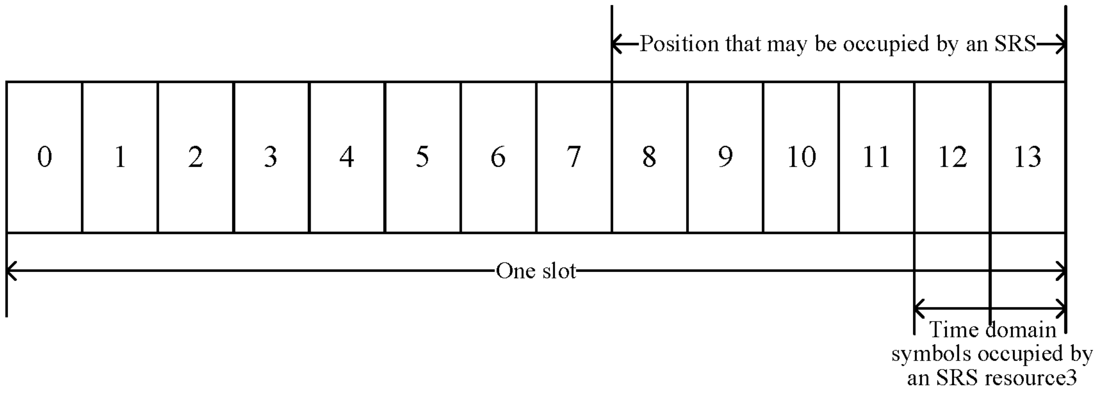
FIG. 4 is a schematic diagram of a time domain symbol position occupied by an SRS resource 3 in a slot according to the embodiment.
Figure 5:
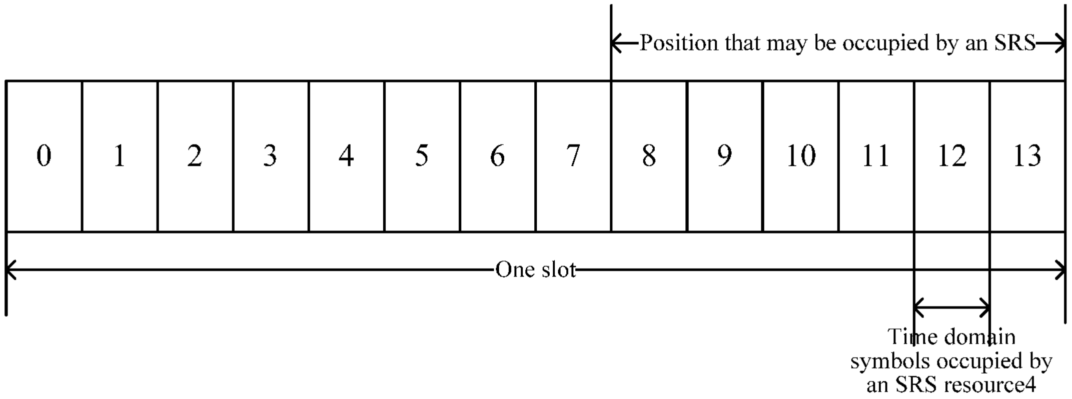
FIG. 5 is a schematic diagram of a time domain symbol position occupied by an SRS resource 4 in a slot according to the embodiment.

In the formula set {(3-1), (3-2), (3-1B), (3-2B)}, M is the number of time domain symbols included in the time domain symbol set that the SRS may occupy in a slot. As shown in FIG. 2 to FIG. 5, the time domain symbols that may be occupied by the SRS is the last six time domain symbols of one slot, and the number of time domain symbols occupied by one SRS resource in one slot belongs to {1, 2, 4}. Then, M=6. $l_1$ is the relative index of the time domain symbols occupied by the SRS resource among the preset M time domain symbols. As shown in FIG. 2 to FIG. 5, $l_1$ is the relative index of the time domain symbol occupied by the SRS resource among the last 6 time domain symbols in one slot. As shown in FIG. 2, FIG. 2 is a schematic diagram of a time domain symbol position occupied by an SRS resource1 in a slot according to an embodiment. The SRS resource1 occupies four time domain symbols {9, 10, 11, 12} in a slot, and correspondingly $l_1$={1, 2, 3, 4}. As shown in FIG. 3, the SRS resource2 occupies two time domain symbols {11, 12} in a slot, and the corresponding $l_1$={3, 4}. FIG. 4 is a schematic diagram of a time domain symbol position occupied by an SRS resource 3 in a slot according to an embodiment. As shown in FIG. 4, the SRS resource 3 occupies two time domain symbols {12, 13} in a slot, and correspondingly $l_1$={4, 5}. FIG. 5 is a schematic diagram of a time domain symbol position occupied by an SRS resource4 in a slot according to an embodiment. As shown in FIG. 5, the SRS resource4 occupies one time domain symbol {12} in a slot, and correspondingly $l_1$={4}.

The above-mentioned symbol indexes $l_1$ of the M time domain symbols are numbered sequentially in chronological order from front to back, that is, the index 11 of the foremost time domain symbol among the M time domain symbols is 0. The embodiment does not exclude that the symbol indexes $l_1$ of the M time domain symbols are numbered sequentially in chronological order from back to front, that is, the index $l_1$ of the backmost time domain symbol among the M time domain symbols corresponds to 0. As shown in FIG. 2 to FIG. 5, $l_1$ is the relative index of the time domain symbol occupied by the SRS resource among the last six time domain symbols in a slot. As shown in FIG. 2, the SRS resource1 occupies four time domain symbols {9, 10, 11, 12} in a slot, and correspondingly $l_1$={4, 3, 2, 1} As shown in FIG. 3, the SRS resource2 occupies two time domain symbols {11, 12} in a slot, and correspondingly $l_1$={2, 1}. As shown in FIG. 4, the SRS resource 3 occupies two time domain symbols {12, 13} in a slot, and correspondingly $l_1$={1, 0} As shown in FIG. 4, the SRS resource 3 occupies one time domain symbol {12} in a slot, and correspondingly $l_1$={1}.

In the formula set {(3-3), (3-4), (3-3B), (3-4B)}, the number of time domain symbols included in one slot is 14, and then N=14. As shown in FIG. 2 to FIG. 5, the time domain symbols that the SRS may occupy are the last six time domain symbols in a slot, and the number of time domain symbols occupied by an SRS resource in a slot belongs to {1, 2, 4}. $l_2$ is the index information of the time domain symbol occupied by the SRS resource and included in the time domain symbol set in a slot. As shown in FIG. 2 to FIG. 5, $l_2$ is the index information of the time domain symbol occupied by the SRS resource in the set including 14 time domain symbols and included in one slot. As shown in FIG. 2, the SRS resource1 occupies four time domain symbols {9, 10, 11, 12} in a slot, and correspondingly $l_2$={9, 10, 11, 12} As shown in FIG. 3, the SRS resource2 occupies two time domain symbols {11, 12}, and correspondingly $l_2$={11, 12} As shown in FIG. 4, the SRS resource 3 occupies two time domain symbols {12, 13} in a slot, and correspondingly $l_2$=={12, 13} As shown in FIG. 5, the SRS resource4 occupies one time symbol {12} in a slot, and correspondingly $l_2$={12}.

$l_2$ is the symbol index of the time domain symbol occupied by the SRS among N time domain symbols included in a slot and the symbol indexes are numbered sequentially in chronological order from front to back, that is, $l_2$ of the starting time domain symbol among the N time domain symbols in the slot is 0. The embodiment does not exclude that the symbol indexes of the N time symbols included in a slot are numbered sequentially in chronological order from front to back, that is, $l_2$ of the end time domain symbol among the N time domain symbols in the slot corresponds to 0. As shown in FIG. 2, the SRS resource1 occupies four time domain symbols {9, 10, 11, 12} in a slot, and correspondingly $l_2$={4, 3, 2, 1} As shown in FIG. 3, the SRS resource2 occupies two time domain symbols {11, 12} in a slot, and correspondingly $l_2$={2, 1} As shown in FIG. 4, the SRS resource 3 occupies two time domain symbols {12, 13} in a slot, and correspondingly. As shown in FIG. 5, the SRS resource 3 occupies one time domain symbol {12} in a slot, and correspondingly $l_2$={1}.

In the embodiment, the terminal determines the SRS reference signal according to the sequence group number, and sends the reference signal via the SRS port.

The above is taking the reference signal sequence acquisition of the uplink measurement reference signal as an example. Similarly, this method may also be used for the reference signal sequence of the uplink demodulation reference signal, or may also be used for the sequence group number of the ZC sequence used for frequency domain spreading of the uplink control channel. Details are not described here again.

In the embodiment, although N and M are preset fixed values, N and M are also called acquisition parameters or input parameters of the function h( ).

In another embodiment, the base station may also allocate information about N and/or M to the terminal.

Exemplary Embodiment Two

In the embodiment, a base station sends signaling information. The signaling information includes selection information for Q parameter sets. The terminal obtains a sequence group number and/or a sequence number of a reference signal according to a parameter set indicated by the signaling information, and obtains the reference signal according to the sequence group number and/or the sequence number. The Q is a positive integer greater than or equal to 1.

For example, Q parameter sets includes a first parameter set and a second parameter set. The first parameter set at least includes one of the following parameters: the number L of time domain symbols occupied by the reference signal in one time unit, index information of time domain symbols occupied by the reference signal among the L time domain symbols, or a time unit index obtained according to a BWP in which the reference signal is located. When the reference signal is a measurement reference signal, the number L of time domain symbols occupied by the reference signal in one time unit is the number L of time domain symbols occupied by a measurement reference signal resource in one time unit.

The second parameter set at least includes one of the following parameters: the number N of time domain symbols included in one time unit; a positive integer M; index information of time domain symbols in which the reference signal is located in one time unit; index information of the time domain symbol in which the reference signal is located among M preset time domain symbols; a frame number; the number B of time units included in the frame; or a time unit index obtained according to the BWP in which the reference signal is located.

The parameter set at least includes one parameter.

As shown in FIG. 2 to FIG. 5, the number of time domain symbols occupied by an SRS resource in a slot belongs to {1, 2, 4}, and the time domain symbols that the SRS may occupy is the last six time domain symbols in a slot.

If the sequence group number is obtained with the first parameter set, the formula h( ) of the sequence group number hopping (1-0) is as shown in the formula (4-1).

$$h(l, L, n_s) = l_0 + n_s * L, \tag{4-1}$$

And/or when the sequence number hopping is enabled, the sequence number $v=c(z_1)$ and $z_1$ is obtained by using the following formula.

$$z_1 = l_0 + n_s * L \tag{4-1B}$$

L is the number of time domain symbols occupied by an SRS resource in a slot, and $l_0$ is the index information of the time domain symbols occupied by the SRS resource among the L time domain symbols occupied by the SRS resource in the slot. As shown in FIG. 2, the SRS resource1 occupies four time domain symbols {9, 10, 11, 12} in a slot, and correspondingly $l_0$={0, 1, 2, 3} and L=4. As shown in FIG. 3, the SRS resource2 occupies two time domain symbols {11, 12} in a slot, and correspondingly $l_0$={0, 1} and L=2. As shown in FIG. 4, the SRS resource 3 occupies two time domain symbols {12, 13} in a slot, and correspondingly $l_0$={0, 1} and L=2. As shown in FIG. 5, the SRS resource4 occupies one time domain symbol {12} in a slot, and correspondingly $l_0$={0} and L=1.

If the sequence group number is obtained with the second parameter set, the hopping formula h( ) of the sequence group number is one of formulas (4-2) to (4-5).

$$h(l_1, M, n_s) = l_1 + n_s * M; \tag{4-2}$$

$$h(l_1, M, n_s, n_f) = l_1 + n_s * M + B * n'_f * M; \tag{4-3}$$

$$h(l_2, N, n_s) = l_2 + n_s * N; \tag{4-4}$$

$$h(l_2, N, n_s, n_f) = l_2 + n_s * N + B * n'_f * N \tag{4-5}$$

And/or when the sequence number hopping is enabled, the sequence number $v=c(z_1)$ and $z_1$ is obtained by using the following formula.

$$z_1 = l_1 + n_s * M \tag{4-2B}$$

$$z_1 = l_1 + n_s * M + B * n'_f * M \tag{4-3B}$$

$$z_1 = l_2 + n_s * N \tag{4-4B}$$

$$z_1 = l_2 + n_s * N + B * n'_f * N \tag{4-5B}$$

In the formula set {(4-3), (4-5), (4-3B), (4-5B)}, B is the number of slots included in one frame, $n'_f=n_f$ or $n'_f=n_f$ mod(E). $n_f$ is the frame number of the frame in which the reference signal is located, or may also be referred to as the frame index. FIG. 6 is a schematic diagram of a frame including 40 slots according to an embodiment. As shown in FIG. 6, one frame corresponds to 10 ms, one frame includes 40 slots, and then B is equal to 40. E is a predetermined value, and in an embodiment, E is an integer multiple of C.

In the formula set {(4-2), (4-3), (4-2B), (4-3B)}, M is the number of time domain symbols included in the time domain symbol set that the SRS may occupy in a slot. As shown in FIG. 2 to FIG. 5, the SRS may occupy the last six time domain symbols of a slot in the slot, and the number of time domain symbols occupied by an SRS resource in the slot belongs to {1, 2, 4}. That is, an SRS resource may occupy {1, 2, 4} time domain symbols among the last six time domain symbols in a slot, and then M=6. $l_1$ is the relative index of the time domain symbol occupied by the SRS resource among the preset M time domain symbols. As shown in FIG. 2 to FIG. 5, $l_1$ is the relative index of the time domain symbol occupied by the SRS resource among the last 6 time domain symbols in one slot. As shown in FIG. 2, the SRS resource1 occupies four time domain symbols {9, 10, 11, 12} in a slot, and correspondingly $l_1$={1, 2, 3, 4} As shown in FIG. 3, the SRS resource2 occupies two time domain symbols {11, 12} in a slot, and correspondingly $l_1$={3, 4} As shown in FIG. 4, the SRS resource 3 occupies two time domain symbols {12, 13} in a slot, and correspondingly $l_1$={4, 5}. As shown in FIG. 5, the SRS resource4 occupies one time domain symbol {12} in a slot, and correspondingly $l_1$={4}.

The above-mentioned symbol indexes $l_1$ of the M time domain symbols are numbered sequentially in chronological order from front to back, that is, the index $l_1$ of the foremost time domain symbol among the M time domain symbols is 0. The embodiment does not exclude that the symbol indexes $l_1$ of the M time domain symbols are numbered sequentially in chronological order from back to front, that is, the index $l_1$ of the backmost time domain symbol among the M time domain symbols corresponds to 0. As shown in FIG. 2 to FIG. 5, $l_1$ is the relative index of the time domain symbol occupied by the SRS resource among the last six time domain symbols in a slot. As shown in FIG. 2, the SRS resource1 occupies four time domain symbols {9, 10, 11, 12} in a slot, and correspondingly $l_1$={4, 3, 2, 1} As shown in FIG. 3, the SRS resource2 occupies two time domain symbols {11, 12} in a slot, and correspondingly $l_1$={2, 1}. As shown in FIG. 4, the SRS resource 3 occupies two time domain symbols {12, 13} in a slot, and correspondingly $l_1$={1, 0}. As shown in FIG. 5, the SRS resource 3 occupies one time domain symbol {12} in a slot, and correspondingly $l_1$={1}

In the formula set {(4-4), (4-5), (4-4B), (4-5B)}, the number of time domain symbols included in one slot is 14 and then, or the time domain symbols in a slot in which the reference symbol is located is 14 and then N=14. As shown in FIG. 2 to FIG. 5, the time domain symbols that the SRS may occupy are the last six time domain symbols in a slot, and the number of time domain symbols occupied by an SRS resource in a slot belongs to {1, 2, 4}. $l_2$ is the index information of the time domain symbol occupied by the SRS resource and included in a set including N time domain symbols and included in one slot. As shown in FIG. 2 to FIG. 5, $l_2$ is the index information of the time domain symbol occupied by the SRS resource in a set including 14 time domain symbols and included in one slot. As shown in FIG. 2, the SRS resource1 occupies four time domain symbols {9, 10, 11, 12} in a slot, and correspondingly $l_2$={9, 10, 11, 12} As shown in FIG. 3, the SRS resource2 occupies two time domain symbols {11, 12} in a slot, and correspondingly $l_2$={11, 12}. As shown in FIG. 4, the SRS resource 3 occupies two time domain symbols {12, 13} in a slot, and correspondingly $l_2$={12, 13} As shown in FIG. 5, the SRS resource4 occupies one time domain symbol {12} in a slot, and correspondingly $l_2$={12}.

$l_2$ is the symbol index of the time domain symbol occupied by the SRS among N time domain symbols included in a slot and the symbol indexes are numbered sequentially in chronological order from front to back, that is, $l_2$ of the starting time domain symbol among the N time domain symbols in the slot is 0. The embodiment does not exclude that the symbol indexes $l_2$ of the N time symbols included in a slot are numbered sequentially in chronological order from front to back, that is, of the end time domain symbol among the N time domain symbols in the slot corresponds to 0. As shown in FIG. 2, the SRS resource1 occupies four time domain symbols {9, 10, 11, 12} in a slot, and correspondingly $l_2$={4, 3, 2, 1} As shown in FIG. 3, the SRS resource2 occupies two time domain symbols {11, 12} in a slot, and correspondingly $l_2$={2, 1} As shown in FIG. 4, the SRS resource 3 occupies two time domain symbols {12, 13} in a slot, and correspondingly $l_2$={1, 0}. As shown in FIG. 5, the SRS resource 3 occupies one time domain symbol {12} in a slot, and correspondingly $l_2$=1.

In the embodiment, the base station may also send signaling information to indicate a formula used for obtaining h( ) of the sequence group number obtaining formula (1-0) to the terminal. The formula includes at least formula (4-1) and one in the formula set {(4-2) to (4-5)}.

Similarly, the base station may also send signaling information to indicate a formula used for obtaining $z_1$ of the sequence number hopping formula v=c($z_1$) to the terminal. The formula includes at least formula (4-1B) and one in the formula set {(4-2B) to (4-5B)}.

In another embodiment, Q parameter sets at least includes a third parameter set and a fourth parameter set. The third parameter set includes time domain symbol information, and the fourth parameter set does not include the time domain symbol information.

If the sequence group number is obtained with the fourth parameter set, the h( ) of the sequence group number obtaining formula is as shown in the formula (4-6).

$$h(n_s) = n_s, \tag{4-6}$$

Similarly, if the sequence number is obtained with the fourth parameter set, $z_1$ of the sequence number v=c($z_1$) is as shown in the formula (4-6B).

$$z_1 = n_s, \tag{4-6B}$$

The base station may also notify through signaling a formula, in the formula set, referred to for sequence number hopping, and the formula set may include any two or more of the formulas (4-1) to (4-6).

Similarly, the base station may also notify through signaling a formula, in the formula set, referred to for determining Z, of the sequence number hopping v=c($z_1$), and the formula set may include any two or more of the formulas (4-1B) to (4-6B).

The parameter set in the embodiment may also be selected from a plurality of parameter sets by using a rule agreed between the base station and the terminal. Similarly, the formula in the embodiment may also be selected from a plurality of formulas by using a rule agreed between the base station and the terminal.

Exemplary Embodiment Three

In the embodiment, a sequence group number of an uplink demodulation reference signal may also be obtained by using the method described in the above-mentioned exemplary embodiment one and/or exemplary embodiment two.

Exemplary Embodiment Four

In the embodiment, a sequence group number of an uplink control channel frequency domain spreading may also be obtained by using the method described in the above-mentioned exemplary embodiment one and/or exemplary embodiment two.

For example, in the physical uplink control channel (PUCCH) formats 1 and 2 in NR, uplink control information is spread in the frequency domain by using $$r_{u,v}^{(\alpha,\delta)}(n),$$

and the sequence group number u may also be obtained by using the method described in the above-mentioned exemplary embodiment one and/or exemplary embodiment two.

Exemplary Embodiment Five

In the embodiment, $n_s$ is the index information of the slot in which the reference signal is located among B slots included in one radio frame. Since the BWPs in which the reference signal (such as the SRS) is located are different and the subcarrier spacings corresponding to the BWPs are different, the numbers of slots included in one frame corresponding to different BWPs are different, that is, B is different, and then $n_s$ is different. $n_s$ is obtained based on the BWP in which the SRS is located.

Figure 7:
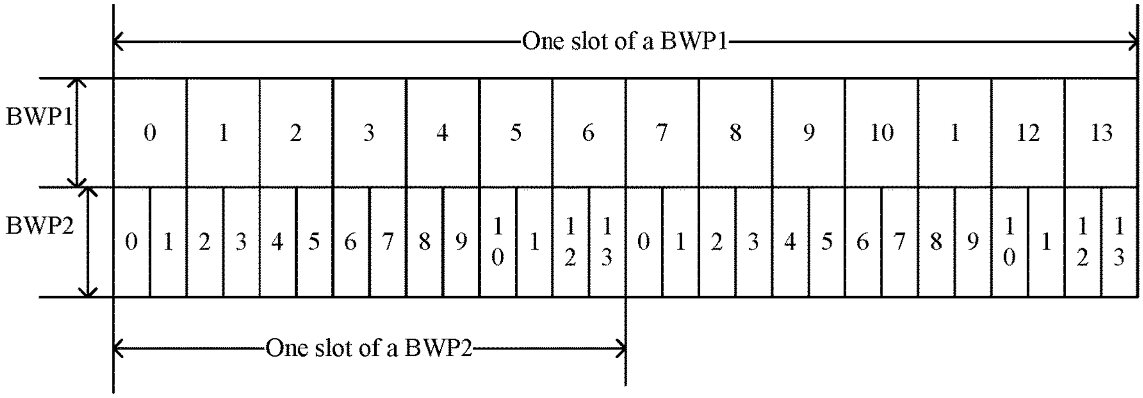
FIG. 7 is a schematic diagram of different BWPs corresponding to different slot serial numbers according to an embodiment.

FIG. 7 is a schematic diagram of different BWPs corresponding to different slot serial numbers according to an embodiment. As shown in FIG. 7, one slot in the BWP1 corresponds to two slots in the BWP2, so that $n_s$ in the above-mentioned embodiment is the slot serial number obtained according to the subcarrier spacing of the BWP in which the reference signal is located. For example, a frame is 10 ms, one frame including 20 slots is obtained according to the subcarrier spacing corresponding to the BWP1, and one frame including 40 slots is obtained according to the subcarrier spacing corresponding to the BWP2. At time t, if the BWP in which the reference signal is currently located is the BWP1 as shown in FIG. 7, $n_s$=x, and if the BWP in which the reference signal is currently located is the BWP2 as shown in FIG. 7, $n_s$=2x or $n_s$=2x+1.

Exemplary Embodiment Six

In the embodiment, the manner of obtaining the parameter of the sequence group number or the sequence number is determined by signaling information or an agreed rule.

In an embodiment, the sequence group number u is obtained according to formulas (6-1) and (6-2).

$$u=(f_{gh}(n_s)+f_{ss})\bmod 30 \tag{6-1}$$

$$f_{gh}(n_s)=\begin{cases}0 & \text{If grouping number hopping is disabled} \\ \left(\sum_{I=0}^{7} C(8h()+i)*2^i\right)\bmod 30 & \text{If grouping number hopping is disabled'}\end{cases} \tag{6-2}$$

where $$h(l_5, N_5, n_s)=l_5+n_s^* N_5.$$

Or when the sequence number hopping is enabled, the sequence number $v=c(z_1)$. $z_1=l_5+n_s*N_5$.

The manner of obtaining $(l_5, N_5)$ is determined by the signaling information or the agreed rule, or the meaning of $(l_5, N_5)$ is determined by the signaling information or the agreed rule. The obtaining manner includes at least two of the three manners.

Manner 1: $(l_5, N_5)=(l_0, L)$. L is the number of time domain symbols occupied by an SRS resource in a slot. As shown in FIG. 2, L=4, $l_5$ is an index of the time domain symbol in which the reference signal is located among the L time domain symbols, and $0 \le l_5 \le L-1$. For example, $l_5$ of the time domain symbol 9 in which the reference signal is located in FIG. 2 is 0.

Manner 2: $(l_5, N_5)=(l_1, M)$. M is the number of time domain symbols included in the time domain symbol set that the SRS may occupy in a slot. As shown in FIG. 2, the SRS of every user may occupy only {1, 2, 4} time domain symbols of the last six time domain symbols in one slot, and then M=6. $l_5$ is the index of the time domain symbol in which the reference signal is located among the M time domain symbols, and $0 \le l_5 \le M-1$. For example, $l_5$ of the time domain symbol 9 in which the SRS is located in FIG. 2 is 1.

Manner 3: $(l_5, N_5)=(l_2, N)$. N is the number of time domain symbols included in in a slot in which the SRS resource is located. As shown in FIG. 2, N=14, $l_5$ is an index of the time domain symbol in which the reference signal is located among the L time domain symbols, and $0 \le l_5 \le N-1$. For example, $l_5$ of the time domain symbol 9 in which the reference signal is located in FIG. 2 is 9.

Exemplary Embodiment 7

In the embodiment, a sequence number is obtained according to at least one of following pieces of information: the number N of time domain symbols included in a time unit in which the reference signal is located; a positive integer M; index information of time domain symbols in which the reference signal is located among N time domain symbols included in one time unit; index information of the time domain symbol in which the reference signal is located among M preset time domain symbols; a frame number of a frame in which the reference signal is located; the number B of time units included in the frame in which the reference signal is located; or a time unit index obtained according to a subcarrier spacing of a BWP in which the reference signal is located. The reference signal is obtained according to the sequence number, and transmitted via the reference signal port.

In an embodiment, the reference signal is $r_{u,v}^{(\alpha,\delta)}(n)$, v is the sequence number, and is obtained by using the following formula:

$$v = \begin{cases} 0 & \text{Sequence hopping is disabled} \\ c(z_1) & \text{Sequence hopping is enabled} \end{cases}.$$

$c(z_1)$ is the $z_1$-th value of the Pseudo-random random sequence. The initialization value of the Pseudo-random random sequence is obtained by the agreed rule. The obtaining formula of $z_1$ may be one of the following formulas: $z_1=n_s*N+l_2$; $z_1=n_s*M+l_1$; $z_1=n_s*N+l_2+B*N*n'_f$; $z_1=n_s*M+l_1+B*M*n'_f$; or $z_1=n_s*L+l_0$.

$l_1$ is the index information of the time domain symbol in which the reference signal is located in a preset set including M time domain symbols, and $0 \le l_1 < M$. $l_2$ is index information of the time domain symbol in which the reference signal is located among N time domain symbols included in one time unit, $0 \le l_2 < N$ and $n'_f=n_f$ or $n'_f=n_f \bmod(E)$. $n_f$ is the frame number of the frame in which the reference signal is located, and E is a predetermined value. B is the number of time units included in the frame in which the reference signal is located. B is the number of slots included in the frame in which the reference signal is located.

In the above-mentioned embodiment, the uplink reference signal is taken as an example, and the present disclosure does not exclude that the reference signal is a downlink reference signal.

From the description of the embodiments described above, it may be understood by those skilled in the art that the method of any embodiment described above may be implemented by means of software plus a general-purpose hardware platform, or may be implemented by hardware. Based on such understanding, the solution provided by the present disclosure may be embodied in the form of a software product. The computer software product is stored in a non-transient storage medium (such as a read-only memory (ROM), a random-access memory (RAM), a magnetic disk or an optical disk) and the storage medium includes multiple instructions for enabling a terminal device (which may be a mobile phone, a computer, a server, or a network device) to perform the method described in any embodiment of the present disclosure.

Embodiment Two

The embodiment further provides an apparatus for transmitting a reference signal. The apparatus is configured to implement the above-mentioned embodiments. What has been described will not be repeated. As used below, the term "module" may be software, hardware or a combination thereof capable of implementing predetermined functions. The apparatus described below in the embodiment may be implemented by software, but implementation by hardware or by a combination of software and hardware is also possible and conceived.

Another embodiment of the present disclosure further provides an apparatus for transmitting a reference signal. The apparatus includes: a first obtaining module, a first determination module and a first transmission module. The first obtaining module is configured to obtain a sequence group number and/or a sequence number of a reference signal according to at least one of following pieces of information: the number N of time domain symbols included in a time unit in which the reference signal is located; a positive integer M; index information of time domain symbols in which the reference signal is located among N time domain symbols included in one time unit; index information of the time domain symbol in which the reference signal is located among M preset time domain symbols; a frame number of a frame in which the reference signal is located; the number B of time units included in the frame in which the reference signal is located; or a time unit index obtained according to a subcarrier spacing of a BWP in which the reference signal is located. The first determination module is configured to determine the reference signal according to the sequence group number and/or the sequence number. The first transmission module is configured to transmit the reference signal. M satisfies the following condition: M is less than or equal to N and is greater than or equal to A. A is the maximum number of time domain symbols allowed to be occupied by the reference signal in one time unit, or A is the number of time domain symbols occupied by the reference signal in one time unit.

Another embodiment of the present disclosure further provides an apparatus for transmitting a reference signal. The apparatus includes: a performing module, which is configured to perform, according to signaling information or a pre-agreed rule, at least one of following operations: selecting a parameter set from a plurality of parameter sets, or selecting a formula from a plurality of formulas; a second determination module, which is configured to determine, according to the selected parameter set and/or the selected formula, a sequence group number and/or a sequence number; a third determination module, which is configured to determine the reference signal according to the sequence group number and/or the sequence number; and a second transmission module, which is configured to transmit the reference signal.

Another embodiment of the present disclosure further provides an apparatus for transmitting a reference signal. The apparatus includes: a fourth determination module, which is configured to determine, according to signaling information or an agreed rule, a manner of obtaining a parameter for generating a sequence group number and/or a sequence number; a fifth determination module, which is configured to determine the parameter according to the obtaining manner; a first generation module, which is configured to generate the sequence group number and/or the sequence number according to the parameter; a sixth determination module, which is configured to determine the reference signal according to the sequence group number and/or the sequence number; and a third transmission module, which is configured to transmit the reference signal.

In the embodiment, the modules of the apparatus in any embodiment described above may perform the corresponding method and steps in the embodiment one.

The plurality of modules described above may be implemented by software or hardware. Implementation by hardware may, but may not necessarily, be performed in the following manner: the plurality of modules described above are located in a same processor or located in their respective processors in any combination form.

Embodiment Three

Another embodiment of the present disclosure further provides a processor. The processor is configured to execute programs which, when executed, perform the method of any one of the embodiments described above.

Embodiment Four

Another embodiment of the present disclosure further provides a storage medium. The storage medium includes stored programs which, when executed, perform the method of any one of the embodiments described above.

Those skilled in the art should know that the above-mentioned at least one module or at least one step of the present disclosure may be implemented by a general-purpose computing apparatus, and the above-mentioned at least one module or at least one step may be concentrated on a single computing apparatus or distributed on a network composed of a plurality of computing apparatuses. In an embodiment, the above-mentioned at least one module or at least one step may be implemented by program codes executable by the computing apparatuses, so that they may be stored in a storage apparatus to be executed by the computing apparatuses. In some circumstances, the illustrated or described steps may be executed in sequences different from those described herein, or the above-mentioned at least one module or at least one step may be separately made into at least one integrated circuit module, or a plurality of modules or steps therein may be made into a single integrated circuit module for implementation. In this way, the present disclosure is not limited to any specific combination of hardware and software.

What is claimed is:

1. A method for transmitting a reference signal, comprising:

determining, by a first wireless communication node, at least one of a sequence group number u and a sequence number v;

wherein $u=(f_{gh}(x)+f_{ss}) \bmod C$, wherein C is a total number of sequence groups, and $f_{ss}$ is obtained according to a parameter comprised in received signaling information, wherein $$f_{gh}(x) = \left(\sum_{l=0}^{D-1} C(D*h(x)+i)*2^i\right) \bmod C,$$

wherein h(x) is determined by one of following formula $h(x)=h(l_2, N, n_s)=l_2+n_s*N$, wherein x includes $_2$, N and $n_s$;

$$h(x) = h(l_2, N, n_s, n_f) = l_2 + n_s*N + B*n'_f*N,$$

wherein x includes $l_2$, N, $n_s$, and $n_f$, wherein $v=c(z_1)$, $z_1$ is determined by one of following $z_1=l_2+n_s*N$, wherein x includes $l_2$, N, and $n_s$, $$z_1 = l_2 + n_s*N + B*n'_f*N,$$

wherein x includes $l_2$, N, $n_s$, and $n_f$, wherein $l_2$ is a time domain symbol index in which the reference signal is located among N time domain symbols comprised in a slot including the reference signal, $0 \le l_2 < N$, and $n_s$ is an index of the slot among B slots included in one frame, B is the number of slots included in the one frame. B is obtained according to the subcarrier spacing of the bandwidth part (BWP) in which the reference signal is located, $$n'_f$$

is determined by $n_f$ which is a frame index of the one frame in which the reference signal is located, $n_s \in \{0,1. \ldots, B-1\}$; and wherein D is an integer equaling to 8, c(z) is a z-th value in a sequence generated by a random sequence c(.), and z is a non-negative integer, determining a reference signal according to the at least one of the sequence group number u and the sequence number y; and transmitting, by the first wireless communication node, the reference signal.

2. The method of claim 1, wherein $$n'_f = n_f; \text{ or } n'_f = n_f \bmod(E),$$

wherein E is a predetermined value.

3. The method of claim 1, wherein N=14.

4. The method of claim 1, wherein the time length of one frame is 10 millisecond (ms), B=20 or 40.

5. The method of claim 1, wherein the reference signal is a sounding reference signal (SRS).

6. An apparatus configured to transmit a reference signal, comprising:

a processor and a memory including processor executable code, wherein the processor executable code upon execution by the processor causes the processor to:

perform, according to signaling information, following operations:

determining, by a first wireless communication node, at least one of a sequence group number u and a sequence number v;

wherein $u=(f_{gh}(x)+f_{ss}) \bmod C$;

wherein C is a total number of sequence groups, and $f_{ss}$ is obtained according to a parameter comprised in received signaling information, wherein $$f_{gh}(x) = \left(\sum_{l=0}^{D-1} C(D*h(x)+i)*2^i\right) \bmod C,$$

wherein h(x) is determined by one of following formula $h(x)=h(l_2, N, n)=l_2+n_s*N$, wherein x includes $l_2$, N and $n_s$;

$$h(x) = h(l_2, N, n_s, n_f) = l_2 + n_s*N + B*n'_f*N,$$

wherein x includes $l_2$, N, $n_s$, and $n_f$, wherein $v=c(z_1)$, $z_1$ is determined by one of following $z_1=l_2+n_s*N$, wherein x includes $l_2$, N and $n_s$;

$$z_1 = l_2 + n_s*N + B*n'_f*N,$$

wherein x includes $l_2$, N, $n_s$, and $n_f$, wherein $l_2$, is a time domain symbol index in which the reference signal is located among the N time domain symbols comprised in a slot including the reference signal, $0 \le l_2 < N$, and $n_s$ is an index of the slot among B slots included in one frame, B is the number of slots included in the one frame. B is obtained according to the subcarrier spacing of the bandwidth part (BWP) in which the reference signal is located, $n'_f$ is determined by $n_f$ which is a frame index of the one frame in which the reference signal is located, $n_s \in \{0,1 \ldots, B-1\}$; and wherein D is an integer equaling to 8, c(z) is a z-th value in a sequence generated by a random sequence c(.), and z is a non-negative integer, determining, by the first wireless communication node, a reference signal according to the at least one of the sequence group number and the sequence number; and transmitting, by the first wireless communication node, the reference signal.

7. The apparatus of claim 6, wherein $$n'_f = n_f;\ \text{or}\ n'_f = n_f \bmod(E),$$

wherein E is a predetermined value.

8. The apparatus of claim 6, wherein N=14.

9. The apparatus of claim 6, wherein the time length of one frame is 10 millisecond (ms), B=20 or 40.

10. The apparatus of claim 6, wherein the reference signal is a sounding reference signal (SRS).

11. A method for receiving a reference signal, comprising:

determining, by a second wireless communication node, at least one of a sequence group number u and a sequence number v;

wherein $u=(f_{gh}(x)+f_{ss}) \bmod C$, wherein C is a total number of sequence groups, and $f_{ss}$ is obtained according to a parameter comprised in received signaling information, wherein $$f_{gh}(x) = \left(\sum_{I=0}^{D-1} C(D*h(x)+i)*2^i\right) \bmod C,$$

wherein h(x) is determined by one of following formula $h(x)=h(l_2, N, n_s)=l_2+n_s*N$, wherein x includes $l_2$, N and $n_s$;

$$h(x) = h(l_2, N, n_s, n_f) = l_2 + n_s*N + B*n'_f*N,$$

wherein x includes $l_2$, N, $n_s$, and $n_f$, wherein $v=c(z_1)$, $z_1$ is determined by one of following $z_1=l_2+n_s*N$, wherein x includes $l_2$, N and $n_s$;

$$z_1 = l_2 + n_s*N + B*n'_f*N,$$

wherein x includes $l_2$, N, $n_s$, and $n_f$, wherein $l_2$ is a time domain symbol index in which the reference signal is located among N time domain symbols comprised in a slot including the reference signal, $0 \le l_2 < N$, and $n_s$ is an index of the slot among B slots included in one frame, B is the number of slots included in the one frame. B is obtained according to the subcarrier spacing of the bandwidth part (BWP) in which the reference signal is located, $$n'_f$$

is determined by $n_f$ which is a frame index of the one frame in which the reference signal is located, $n_s \in \{0,1 \ldots, B-1\}$; and wherein D is an integer equaling to 8, c(z) is a z-th value in a sequence generated by a random sequence c(·), and z is a non-negative integer, determining, by the second wireless communication node, a reference signal according to the at least one of the sequence group number u and the sequence number v; and receiving, by the second wireless communication node, the reference signal.

12. The method of claim 11, wherein $$n'_f = n_f;\ \text{or}\ n'_f = n_f \bmod(E),$$

wherein E is a predetermined value.

13. The method of claim 11, wherein N=14.

14. The method of claim 11, wherein the time length of one frame is 10 millisecond (ms), B=20 or 40.

15. The method of claim 11, wherein the reference signal is a sounding reference signal (SRS).

16. An apparatus configured to receive a reference signal, comprising:

a processor and a memory including processor executable code, wherein the processor executable code upon execution by the processor causes the processor to:

determine, by a second wireless communication node, at least one of a sequence group number u and a sequence number v;

wherein $u=(f_{gh}(x)+f_{ss}) \bmod C$;

wherein C is a total number of sequence groups, and $f_{ss}$ is obtained according to a parameter comprised in received signaling information, wherein $$f_{gh}(x) = \left(\sum_{I=0}^{D-1} C(D*h(x)+i)*2^i\right) \bmod C,$$

wherein h(x) is determined by one of following formula $h(x)=h(l_2, N, n_s)=l_2+n_s*N$, wherein x includes $l_2$, N and $n_s$;

$$h(x) = h(l_2, N, n_s, n_f) = l_2 + n_s*N + B*n'_f*N,$$

wherein x includes $l_2$, N, $n_s$, and $n_f$, wherein $v=c(z_1)$, $z_1$ is determined by one of following $z_1=l_2+n_s*$ N, wherein x includes $l_2$, N and $n_s$;

$$z_1 = l_2 + n_s*N + B*n'_f*N,$$

wherein x includes $l_2$, N, $n_s$, and $n_f$, wherein $l_2$ is a time domain symbol index in which the reference signal is located among the N time domain symbols comprised in a slot including the reference signal, $0 \le l_2 < N$, and $n_s$ is an index of the slot among B slots included in one frame, B is the number of slots included in the one frame. B is obtained according to the subcarrier spacing of the bandwidth part (BWP) in which the reference signal is located, $$n'_f$$

is determined by $n_f$ which is a frame index of the one frame in which the reference signal is located, $n_s \in \{0,1 \ldots, B-1\}$; and wherein D is an integer equaling to 8, c(z) is a z-th value in a sequence generated by a random sequence c(·), and z is a non-negative integer, determining, by the second wireless communication node, a reference signal according to the at least one of the sequence group number and the sequence number; and receiving, by the second wireless communication node, the reference signal.

17. The apparatus of claim 16, wherein $$n'_f = n_f; \text{ or } n'_f = n_f \bmod(E),$$

wherein E is a predetermined value.

18. The apparatus of claim 16, wherein N=14.

19. The apparatus of claim 16, wherein the time length of one frame is 10 ms (millisecond), B=20 or 40.

20. The apparatus of claim 16, wherein the reference signal is a sounding reference signal (SRS).

* * * * *